United States Patent
Takahashi et al.

(10) Patent No.: US 7,106,506 B2
(45) Date of Patent: Sep. 12, 2006

(54) LENTICULAR LENS SHEET AND PROJECTION SCREEN

(75) Inventors: Katsunori Takahashi, Tokyo-to (JP); Toshie Chijiwa, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 0 days.

(21) Appl. No.: 11/236,240

(22) Filed: Sep. 27, 2005

(65) Prior Publication Data

US 2006/0023305 A1 Feb. 2, 2006

Related U.S. Application Data

(62) Division of application No. 10/399,332, filed as application No. PCT/JP01/09149 on Oct. 18, 2001.

(30) Foreign Application Priority Data

Nov. 9, 2000 (JP) ............................. 2000-342123

(51) Int. Cl.
*G03B 21/60* (2006.01)
*G02B 27/10* (2006.01)
*H04N 15/00* (2006.01)

(52) U.S. Cl. ...................... 359/455; 359/459; 359/621; 348/59

(58) Field of Classification Search ................ 359/455, 359/457, 459, 454, 443, 463, 619, 621; 348/747, 348/59

See application file for complete search history.

(56) References Cited

U.S. PATENT DOCUMENTS 6,384,970 B1* 5/2002 Abe et al. ................... 359/455
2004/0012850 A1* 1/2004 Takahashi et al. .......... 359/455

* cited by examiner

*Primary Examiner*—W. B. Perkey
*Assistant Examiner*—Magda Cruz
(74) *Attorney, Agent, or Firm*—Ladas & Parry LLP

(57) ABSTRACT

A high contrast lenticular lens sheet that can improve the brightness of an image and the angle of visibility. When it is assumed that P represents the pitch of the lens element and H represents the width of the black stripe portion as viewed in a cross section perpendicular to the lens element, the difference F in height between the black stripe portion and the lens element is set to have a range that is expressed by the inequality:

$$0.098\ P \leq F \leq (P-H)/2\ \tan(\pi/3).$$

Simultaneously, the width B as measured from an apex portion of the black stripe portion in regard to a colored portion on a side wall of the black stripe portion is set to have a range that is expressed by the inequality:

$$0.30\ F \leq B \leq 0.89\ F.$$

5 Claims, 8 Drawing Sheets

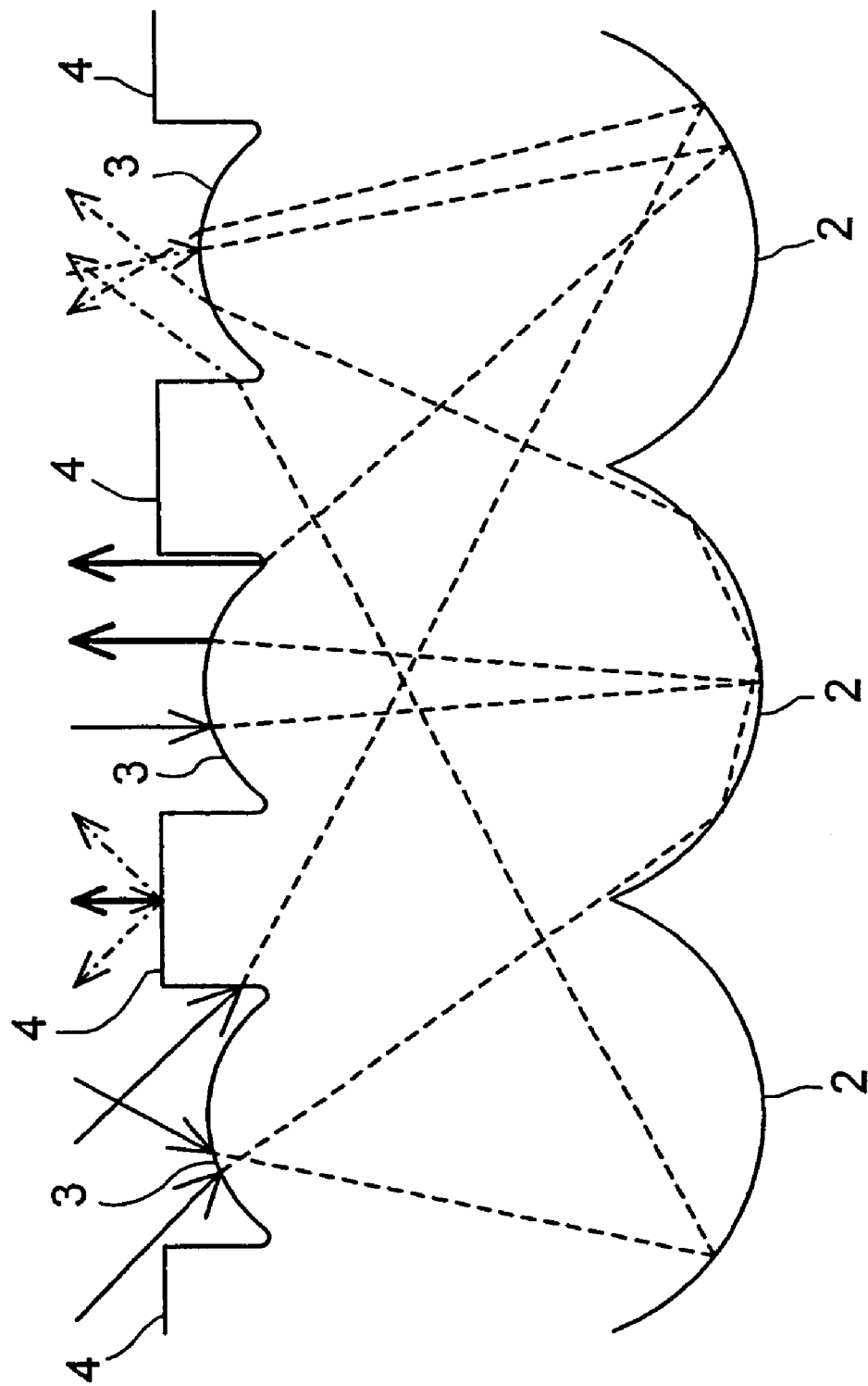

FIG. 6

TABLE 1

|  | Product now available | sample 1 | sample 2 |
|---|---|---|---|
| width A (μm) | 20 | 15 | 7 |
| width B (μm) | 15 | | |
| reflectance of the colored portion | all-light-ray reflectance, 4. 6% or less, diffuse reflectance, 3. 7% or less | | |
| Difference F (μm) in height | 90 | | |
| width H (μm) | 335 | | |
| Pitch (μm) | 715 | | |
| Evaluation of the contrast | × | ○ | ○ |

FIG. 7

TABLE 2

|  | Sample 2 | Sample 3 | Sample 4 | Sample 5 | Sample 6 | Sample 7 | Sample 8 | Sample 9 |
|---|---|---|---|---|---|---|---|---|
| Width A (μm) | 7 | | | | | | | |
| Width B (μm) | 15 | 20 | 30 | 80 | 85 | 30 | | |
| Reflectance of the colored portion | all-light-ray reflectance, 4.6% or less, diffuse reflectance, 3.7% or less | | | | | | | |
| Difference F (μm) in height | 90 | | | | | 45 | 70 | 100 |
| Width H (μm) | 355 | | | | | | | |
| pitch (μm) | 715 | | | | | | | |
| Evaluation of the contrast | × | × | ○ | ○ | – | × | ○ | ○ |

FIG. 8

TABLE 3

|  |  | Sample 10 | Sample 11 | Sample 12 | Sample 13 | Sample 14 |
|---|---|---|---|---|---|---|
| Width A (μm) | | 7 | | | | |
| Width B (μm) | | 60 | | | | |
| Reflectance of the colored portion | all-light-ray reflectance, 4.6% or less | 4.6% | 4.6% | 4.6% | 4.4% | 4.7% |
| | diffuse reflectance, 3.7% or less | 3.7% | 2.5% | 1.5% | 0.7% | 1.5% |
| Difference F (μm) in height | | 90 | | | | |
| Width H (μm) | | 355 | | | | |
| pitch (μm) | | 715 | | | | |
| Evaluation of the contrast | | × | × | ○ | ○ | × |

LENTICULAR LENS SHEET AND PROJECTION SCREEN

TECHNICAL FIELD

The present invention relates to a lenticular lens that is usable for a rear projection television, etc., and a projection screen that uses the lenticular lens.

BACKGROUND ART

For a rear projection television, there is used a projection screen wherein a lenticular lens is superposed on the light-emission side of a Fresnel lens. At the boundary portion of the lens elements provided on the light-emission side (the viewer side) of the lenticular lens sheet, the so-called black stripe portion that has been colored black is provided in parallel with the lens element for enhancing the contrast (e.g. see Japanese Patent Application Laid-Open No. 10-254064 and Japanese Patent Application Laid-Open No. 2000-284366). As the policy for improving the contrast, attempts have also been made to color the lenticular lens sheet itself.

However, in the conventional lenticular lens sheet, depending on the external-light conditions, it happened that the reflection of the external light by the lens decreased the contrast of the image and this obstructed the viewer's visual recognition of it. The method for solving the lenticular lens sheet itself has the drawback that, although the contrast is improved, the utilization efficiency of the image light decreases; and as a result the brightness of the image as well as the angle of visibility decreases.

DISCLOSURE OF THE INVENTION

Thereupon, the present invention has an object to provide a lenticular lens sheet and a projection screen capable of providing a high contrast and improving the brightness of the image as well as the angle of visibility and to provide a projection screen.

In a first aspect of the present invention, there is provided a lenticular lens sheet comprising a light-emission surface provided with lens elements, a black strip portion being provided at each border between the lens elements, wherein each lens element and a corresponding side wall of the black stripe portion is in contact with each other, or each lens element is connected to the side wall via a portion of connection that, when viewed in a cross section perpendicular to the lens element, has a width A which is greater than 0 and which is equal to or less than 15 μm.

According to this aspect of the invention, it is intended to decrease the amount of the reflected light which, after an external light has been incident upon the lenticular lens sheet from the light-emission surface side, goes out from the border between the lens element and the black stripe portion and from the neighborhood of that border, toward a viewer who is situated in front of the screen. Thereby, it is possible to sufficiently improve the contrast. It is to be noted that a state where each lens element and a side wall of the black stripe portion are in mutual contact with each other means the one where the end edge of the lens element and the side wall of the black stripe portion are continuous without the intermediary of a portion of connection.

In a second aspect of the present invention, there is provided a lenticular lens sheet comprising a light-emission surface provided with lens elements, a black strip portion being provided at each border between the lens elements, wherein when it is assumed that P represents the pitch of the lens element; and H represents a width of the black stripe portion when viewed in a cross section perpendicular to the lens element, the difference F in height between the black stripe portion and the lens element is set to have a range that is expressed by the inequality:

$$0.098\ P \leq F \leq (P-H)/2\ \tan(\pi/3)$$

and wherein the width B as measured from an apex portion of the black stripe portion in regard to a colored portion on a side wall of the black stripe portion is set to have a range that is expressed by the inequality:

$$0.30\ F \leq B \leq 0.89\ F$$

According to this aspect of the invention, it is possible to suppress the increase in the opening area for the incidence of the external light on the light-emission surface side. And it is possible, while suppressing that increase, to provide a sufficient colored area in the black stripe portion and to sufficiently ensure the degree of shield ability for the light-incidence and light-emission of the external light. Thereby, it is possible to enhance the contrast sufficiently. Also, it is possible to ensure the angle of visibility of 60 degrees or more. In addition, it is also possible to prevent the coloring onto the lens element on the light-emission surface side and thereby prevent the occurrence of black-dot defects on the projection screen.

In a third aspect of the present invention, there is provided a lenticular lens sheet comprising a light-emission surface provided with lens elements, a black strip portion being provided at each border between the lens elements, wherein the light reflection property of a colored portion of the black stripe portion is set so that the all-light-ray reflectance thereof is equal to or less than 4.6% and that the diffuse reflectance thereof is equal to or less than 1.5%.

According to this aspect of the invention, the reflected light component, which is included in reflected light components to be reflected upon the surface of the black stripe portion in response to incidence of the external light from the light-emission surface side of the lenticular lens sheet, and which is directed toward the watcher in front of the projection screen, is decreased, so that the contrast is enhanced.

As described above, according to the first to the third aspects of the present invention, the contrast is improved by setting the dimensions of the respective portions and the reflectance thereof to specified conditions. Therefore, even if performing no coloring with respect to the lens sheet, it is possible to sufficiently enhance the contrast and to enhance the utilization efficiency of the image light to thereby provide a bright image. In addition, it is also possible to enhance the angle of visibility. Especially, in case that the lenticular lens sheet has been constructed with the technical features described in the above first to third aspects combined with one another, it is possible to remarkably enhance the contrast, the utilization efficiency of the image light, and the angle of visibility. Therefore, this is preferable.

Further aspect of the present invention, there is provided a projection screen equipped with any one of the above described lenticular lens sheets according to the present invention. According to this aspect of invention, it is possible to provide, utilizing the characteristic of the above-described lenticular lens sheet, the projection screen the contrast of that is high and is excellent in terms of the brightness of the image and the angle of visibility.

Incidentally, the cross section perpendicular to the lens element in the present invention is referred to as a "section"

that can be obtained by sectioning the lenticular lens sheet along with both of the direction parallel to a direction in which the lens elements are arranged and the direction of the optical axis of each lens element. Also, the all-light-ray reflectance of the black stripe portion means a value that has been obtained from the measurement that is in accordance with K7105 of Japanese Industrial Standard (JIS). And the diffuse reflectance means a value that has been obtained from the measurement of the amount of scattered light.

BRIEF DESCRIPTION OF THE DRAWINGS

FIG. 3 is a view illustrating an example of light paths each including an external light incident upon the light-emission surface side of the lenticular lens sheet and a reflected light thereof;

FIG. 6 is a diagram showing a table of results according to the example 1;

FIG. 7 is a diagram showing a table of results according to the example 2; and

FIG. 8 is a diagram showing a table of results according to the example 3.

BEST MODE FOR CARRYING OUT THE INVENTION

Figure 1:
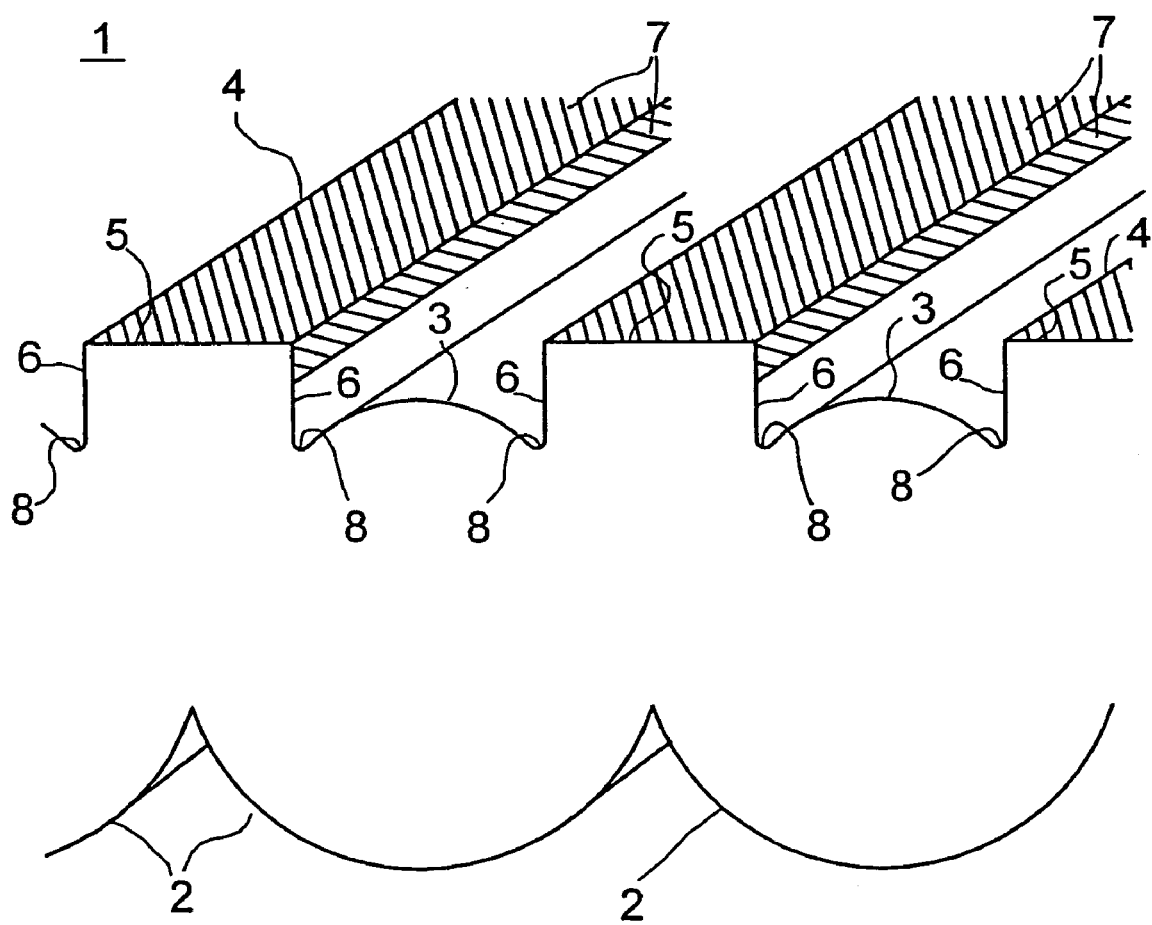
FIG. 1 is a sectional view of a lenticular lens sheet to which the present invention is applied.

FIG. 1 illustrates an embodiment of a lenticular lens sheet to which the present invention is applied. The lenticular lens sheet (hereinafter may according to the cases be abbreviated as "the lens sheet") is constructed of a transparent resin. On the light-incidence surface side (the downside of the illustration) thereof are unidirectionally arranged at equal pitches a number of lens elements 2 . . . 2 each of that has been constructed as a substantially semi-cylindrical convex lens. On the other hand, on the light-emission surface side (the upside of the illustration) of the lens sheet 1 are arranged at equal pitches in the same direction a number of lens elements 3 . . . 3 each of that has been constructed as a substantially semi-cylindrical convex lens similarly. The optical-axis direction of the lens element 2 and that of the lens element 3 coincide with each other.

At a border of the lens elements 3 . . . 3 of the light-emission surface side is formed a black stripe portion 4 . . . 4 in parallel with the lens element 3. The black stripe portion 4 has an apex portion 5 formed into a planar configuration that perpendicularly intersects the thickness direction of the lens sheet (the vertical direction of FIG. 1) 1, and a pair of side walls 6, 6 each of that perpendicularly intersects the apex portion 5. The apex portion 5 more protrudes than the lens element 3. The whole surface of the apex portion 5 and upper end portions of the paired side walls 6 are colored black with a black-color ink that has an external-light absorption property, and are thereby constructed as a colored portion 7. It is to be noted that in FIG. 1 the colored portion 7 is indicated with hatching. Although in FIG. 1 the colored portion 7 of one side wall 6 is only illustrated, the same is true of the colored portion 7 of the opposite side.

Figure 2A:
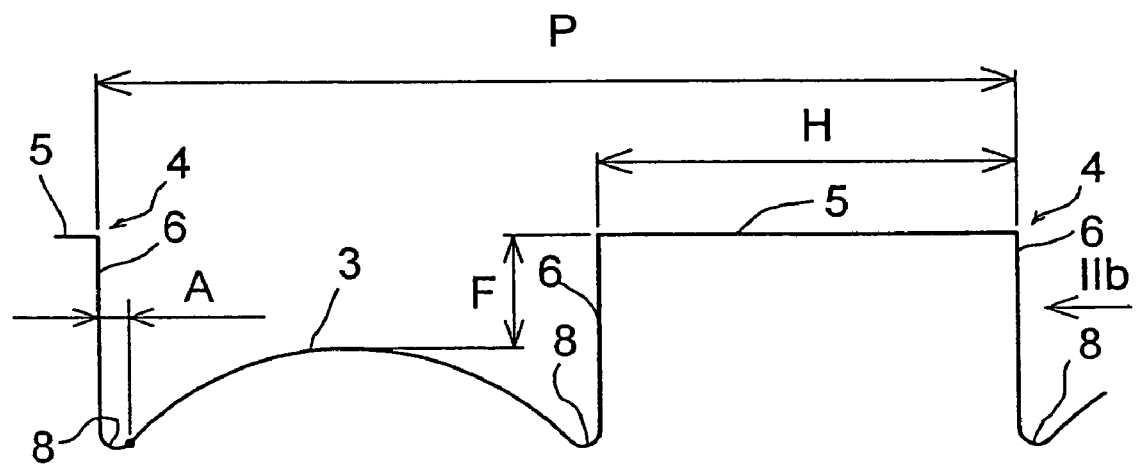
FIGS. 2A and 2B are views each illustrating a main part of the light-emission surface side of the lenticular lens sheet of FIG. 1, 2A being a sectional view that intersects the lens element at a right angle with respect thereto and 2B being a side view taken from the arrow-IIb-indicated direction.
Figure 2B:
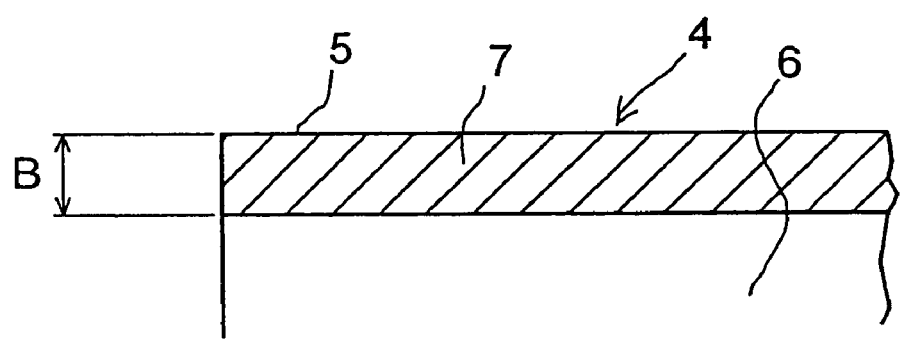

FIG. 2A illustrates a section that intersects the lens element 3 at a right angle with respect thereto on the light-emission surface side of the lens sheet 1. As apparent from this figure, at the joining portion between the lens elements 3 and the black stripe portions 4, there are formed portions of connection 8 . . . 8 each of that has a substantially circular-arc like sectional configuration. It is to be noted that the portion of connection 8 is not limited to a circular-arc section. If it is a portion that has a sectional configuration that is different from that of any one of the lens element 3 and the black stripe portion 4, that portion is included in that portion of connection 8. Also, the border portion between the portion of connection 8 indicated in FIG. 2A by the mark "black circle" and the lens element 3 is a point at which the curvature that is to be imparted to the lens element 3 ends. The border portion between the side wall 6 and the portion of connection 8 is a point at which the flat plane of the side wall 6 ends.

In the lens sheet 1 of the above-described construction, in this embodiment, the physical properties, such as the dimensions, of the respective portions are set as follows.

(1) Regarding the Portion of Connection 8

The width A in the cross section of the lens element 3 has been set so as to be greater than 0 and equal to or smaller than 15 μm. The reason for this is as follows.

FIG. 3 illustrates a state in which the external light that has reached the lens sheet 1 in the light-emission surface side is reflected. As indicated by doted lines in FIG. 3, it is possible that the external light which has entered the interior of the lens sheet 1 from the lens element 3 will be reflected within the lens sheet 1 and go out from the lens element 3. This external light which emits from the lens element 3 is added to the image light which emits from the lens element 3. As a result of this, the contrast decreases. In addition, it is considered as being general that the viewer or watcher looks at the screen from the front (the thickness direction) of the lens sheet 1. Therefore, the external light (that is indicated in bold lines in FIG. 3) which emits straightforward in the thickness direction of the lens sheet 1 has the greatest adverse effect upon the decrease in the contrast. According to the present inventors' studies, it has been confirmed that, from the portion of connection 8, the reflected light relatively more frequently emits especially in the thickness direction of the lens sheet 1. And it has also been confirmed that, the more narrowed the width A of the portion of connection 8, the more remarkably enhanced the contrast that is obtained when the lens sheet 1 has been looked at from the front thereof. The smaller the width A of the connection portion 8, the more preferable it is. It has been confirmed that by setting the width A to a value of 15 μm or less the contrast can be definitely improved.

(2) Regarding the Difference F in Height between the Black Stripe Portion 4 and the Lens Element 3 and the Width B of the Colored Portion 7 of the Side Wall The difference F in height between the black stripe portion 4 and the lens element 3 has been set to the following range relative to the pitch P of the lens element 3 and the width H in the cross-section of the black stripe portion 4.

$$0.098\ P \leq F \leq (P-H)/2\ \tan(\pi/3)$$

Figure 4:
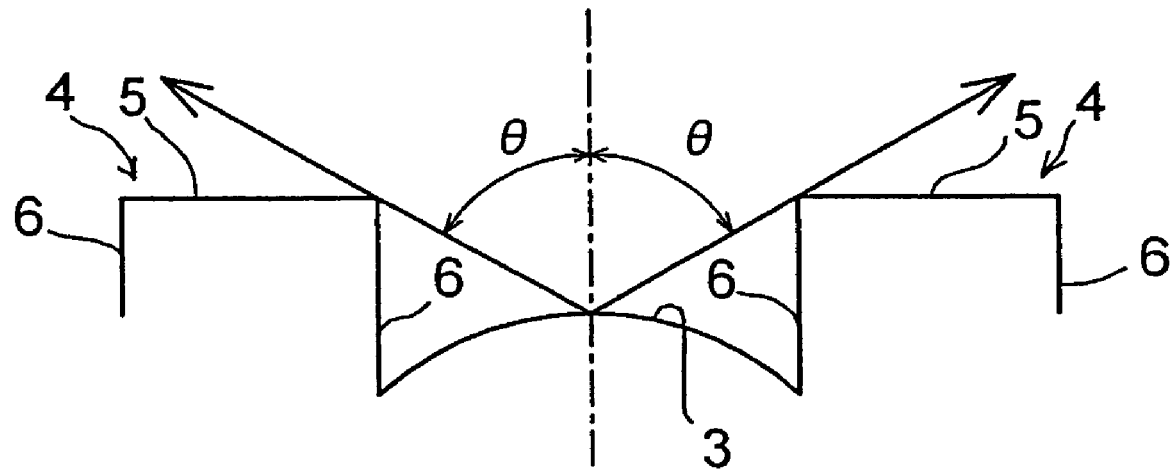
FIG. 4 is a view illustrating the angle of visibility regarding the lens element on the light-emission surface side.

As the difference F in height is greater, it is possible to make narrower the area through which the external light enters the lens element 3. However, when that height F exceeds the value $(P-H)/2\ \tan(\pi/3)$, as illustrated in FIG. 4 the angle of visibility of the diffusion image light that emits from the lens element 3 on the light-emission side becomes 60° C. or less. Therefore, the angle of visibility becomes short, with the result that the screen is unsuitable as the projection screen. On the other hand, when the difference F in height becomes smaller than 0.098P, the area of the opening portion through which the external light enters the lens sheet 1 from the light-emission surface side becomes excessively large. In addition, the area of the colored portion 7 of the black stripe portion 4 becomes short. As a result of these, the improvement effect of the contrast cannot be admitted.

Next, the width B of the colored portion 7 of the side wall 6 of the black stripe portion 4 (provided, however, that the width B is a value that has been obtained by being measured from the apex portion 5 in the thickness direction of the lens sheet 1) has been set to the range that is expressed by the following inequality:

$$0.30\ F \leq B \leq 0.89\ F$$

In case the width B of the colored portion 7 is smaller than 0.30 F, the area for shielding the incidence and emission of the external light by means of the sidewall 6 is insufficient, with the result that the improvement effect of the contrast is not obtained. Further, when the width B exceeds 0.89 F, black-coloring of the colored portion 7 becomes likely to have an effect upon the lens element 3 during the manufacturing process thereof. As a result of this, black-color points defects unsuitably occur on the projection screen.

(3) All-Light-Ray Reflectance and Diffuse Reflectance of the Colored Portion 7

The all-light-ray reflectance of the black stripe portion 4 has been set to 4.6% or less, which the diffuse reflectance has been set to 1.5% or less. Either in case the all-light-ray reflectance exceeds 4.6% or in case the diffuse reflectance exceeds 1.5%, the reflected light components directed from the black stripe portion 4 toward the viewer side non-ignorably increase. As a result of this, the improvement effect of the contrast is lost.

Figure 5:
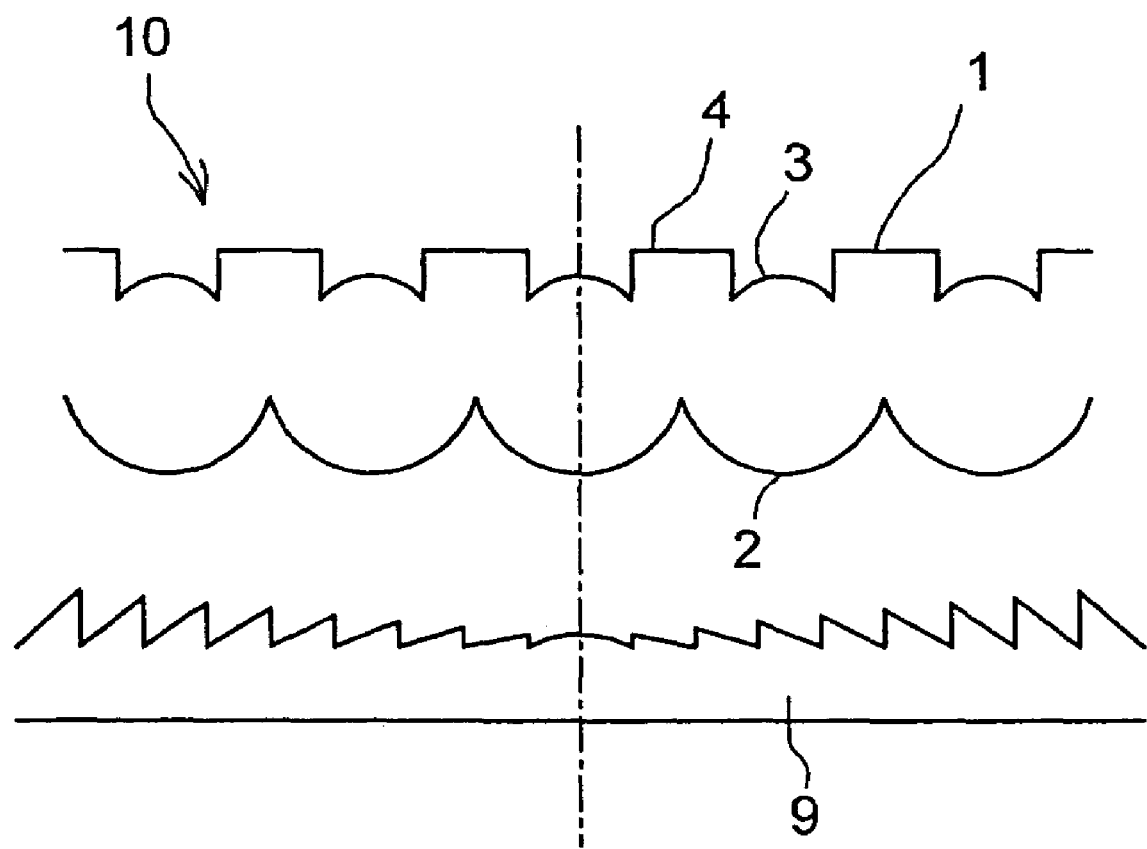
FIG. 5 is a sectional view of a projection screen.

The lens sheet 1 that has been constructed as above is disposed on the light emission side of the Fresnel lens 9 as illustrated in FIG. 5. The projection screen 10 is basically constructed with the combined use of the Fresnel lens 9 and the lenticular lens sheet 1. However, other constituent elements such as a protection screen for preventing flaws or stain may further be superposed on the projection screen 10.

EXAMPLES (1) Example 1

For examining a proper range for the width A of the connection portion 8 between the lens element 3 of the light-emission side and the side wall 6 of the black stripe portion 4, a lenticular lens sheet meeting the conditions of the following table 1 was manufactured. Thereby, the contrast of the resulting screen was evaluated. The evaluated results are concurrently shown as the table 1 in FIG. 6.

From the results of the examinations made as above, it has been confirmed that the width A of the connection portion that is effective for the enhancement of the contrast was 15 µm or less.

(2) Example 2

For examining a proper range for the difference F in height between the black stripe portion 4 and the lens element 3 as well as for the width B of the colored portion 7 on the side wall 6, a lenticular lens sheet meeting the conditions of the following table 2 was manufactured. Thereby, the contrast was evaluated. The evaluated results are concurrently shown as the table 2 in FIG. 7.

From the results of the examinations made as above, the following were confirmed. Namely, the range for the difference F in height that is effective for the enhancement of the contrast is as follows, $$0.098\ P \leq F \leq (P-H)/2\ \tan(\pi/3)$$

while the range for the width B is as follows.

$$0.30\ F \leq B \leq 0.89\ F$$

It is to be noted that the evaluations in the table 2 are the ones that have been made using the sample 2 as a reference and in that the effect of the contrast as measured from that reference has been relatively evaluated. Accordingly, the mark "x" in the table 2 does not indicate that the absolute evaluation of the contrast is unsuitable. The samples 7 to 9 are each intended to examine the height F. This is for the purpose of finding out the lower limit value thereof. To this end, the width B of the colored portion of the side wall in each of the samples 7 to 9 was set to have a lower limit value of 30 µm when the height F was 100 µm (sample 9).

Also, the upper limit value $(P-H)/2\ \tan(\pi/3)$ of the difference F in height is the one that is geometrically determined so as to satisfy the condition that the angle θ (see FIG. 4) becomes 60 degrees. In case the angle θ of visibility is under 60 degrees, it is confirmed that the resulting lenticular lens sheet is unsuitable as the lenticular lens sheet. Also, regarding the upper limit of the width B of 0.89 F, when it exceeds 0.89 F, the following has been confirmed. Namely, that the ink to be applied to the side wall 6 of the black stripe 4 is adhered onto the lens element 3 as well, and that the frequency at which black color dot defects occur on the lens sheet 1 becomes high.

(3) Example 3

For examining a proper range for the light reflection property regarding the colored portion 7 of the black stripe 4, a lenticular lens sheet meeting the conditions described in the following table 3 was manufactured. And the contrast of that sheet was evaluated. The evaluated results are concurrently shown as the table 3 in FIG. 8.

From the results of the examinations made as above, it has turned out that, as the light reflection property of the colored portion 7 effective for the enhancement of the contrast, the all-light-ray reflectance is 4.6% or less while the diffuse reflectance is 1.5% or less. It is to be noted that the evaluations in the table 3 are the ones that have been made using the sample 10 as a reference and in that the effect of the contrast as measured from that reference has been relatively evaluated. Accordingly, the mark "x" in the table 3 does not indicate that the absolute evaluation of the contrast is unsuitable.

The present invention is not limited to the above-described embodiment and examples and permits various changes or modifications to be made without departing from the technical idea described in the scope of the claims. For example, in the above-described embodiment, there has been described the form of construction wherein the connection portion 8 the width A of that is greater than 0 exists between the lens element 3 and the side wall 6 of the black stripe portion 4. However, it may be arranged that if possible with the connection portion 8 being made non-existent, i.e.

with the width A being made to be 0 the lens element 3 and the side wall 6 be in contact with each other.

INDUSTRIAL APPLICABILITY

As has been explained above, according to the present invention, settings have been made, as described above, with regard to the following factors. The width of the border portion between the lens element on the light-emission surface side of the lenticular lens sheet and the black stripe portion; the difference in height between the black stripe portion and the lens element; the width of the colored portion in the side wall of the black stripe portion; and the light reflection property of the black stripe portion. Therefore, it is possible to provide a lenticular lens sheet and projection screen the contrast of that is high and that can improve the brightness of the image as well as the angle of visibility.

The invention claimed is:

1. A lenticular lens sheet comprising a light-emission surface provided with lens elements, a black strip portion being provided at each border between the lens elements,
wherein each lens element is connected to the side wall via a portion of connection that, when viewed in a cross section perpendicular to the lens element, has a width A which is greater than 0 and which is equal to or less than 15 μm, and
wherein said portion of connection is defined by two border portions, one of which is a point at which a curvature imparted to the lens element ends and the other of which is a point at which a flat plane of the side wall ends,
wherein when it is assumed that P represents the pitch of the lens element; and H represents the width of the black stripe portion when viewed in a cross section perpendicular to the lens element, the difference F in height between the black stripe portion and the lens element is set to have a range that is expressed by the inequality:

$$0.098\ P \leq F \leq (P-H)/2 \tan(\pi/3)$$

and wherein the width B as measured from an apex portion of the black stripe portion in regard to a colored portion on a side wall of the black ships portion is set to have a range that is expressed by the inequality:

$$0.30\ F \leq B \leq 0.89\ F.$$

2. A lenticular lens sheet comprising a light-emission surface provided with lens elements, a black strip portion being provided at each border between the lens elements,
wherein each lens element is connected to the side wall via a portion of connection that, when viewed in a cross section perpendicular to the lens element, has a width A which is greater than 0 and which is equal to or less than 15 μm,
wherein said portion of connection is defined by two border portions, one of which is a point at which a curvature imparted to the lens element ends and the other of which is a point at which flat plane of the side wall ends, and
wherein the light reflection property of a colored portion of the black stripe portion is set so that the all-light-ray reflectance thereof is equal to or less than 4.6% and the diffuse reflectance thereof is equal to or less than 1.5%.

3. A projection screen which is equipped with the lenticular lens sheet according to claim 2.

4. A lenticular lens sheet comprising a light-emission surface provided with lens elements, a black strip portion being provided at each border between the lens elements,
wherein when it is assumed that P represents the pitch of the lens element; and H represents a width of the black stripe portion when viewed in a cross section perpendicular to the lens element, the difference F in height between the black stripe portion and the lens element is set to have a range that is expressed by the inequality:

$$0.098\ P \leq F \leq (P-H)/2 \tan(\pi/3)$$

and wherein the width B as measured from an apex portion of the black stripe portion in regard to a colored portion on a side wall of the black stripe portion is set to have a range that is expressed by the inequality:

$$0.30\ F \leq B \leq 0.89\ F$$

and wherein the light reflection property of a colored portion of the black stripe portion is set so that the all-light-ray reflectance thereof is equal to or less than 4.6% and the diffuse reflectance thereof is equal to or less than 1.5%.

5. A projection screen which is equipped with the lenticular lens sheet according to claim 4.

* * * * *